United States Patent [19]

Gilmour

[11] Patent Number: 4,987,563
[45] Date of Patent: Jan. 22, 1991

[54] SYNTHETIC APERTURE MINIMUM REDUNDANCY SONAR APPARATUS

[75] Inventor: John E. Gilmour, Pasadena, Md.

[73] Assignee: Westinghouse Electric Corp., Pittsburgh, Pa.

[21] Appl. No.: 476,209

[22] Filed: Feb. 7, 1990

[51] Int. Cl.⁵ .............................................. G01S 15/00
[52] U.S. Cl. .......................................... 367/88; 367/11
[58] Field of Search ................................... 367/88, 11

[56] References Cited

U.S. PATENT DOCUMENTS 4,088,978  5/1978  Gilmour ................................ 367/88

OTHER PUBLICATIONS

Moffet, "Minimum-Redundancy Linear Arrays," IEEE Transactions on Antennas and Propagation, vol. AP-14, No. 2, Mar. 1988, pp. 172-175.
Wood et al., "Sparse Array Performance," J. Acoust. Soc. Am., vol. 63, No. 6, Jun. 1978, pp. 1866-1872.
Bedrosian, "Nonuniform Linear Arrays: Graph-Theoretic Approach to Minimum Redundancy," Proceedings of the IEEE, vol. 74, Jul. 1986, pp. 1040-1043.
Bucker, "Adaptive Cross-Sensor Beam Forming With Planar Arrays," J. Acoust. Soc. Am., vol. 62, No. 5, Nov. 1977, pp. 1222-1225.

Primary Examiner—Thomas H. Tarcza
Assistant Examiner—Daniel T. Pihulic
Attorney, Agent, or Firm—D. Schron

[57] ABSTRACT

A sonar system including an elongated transducer having a fully populated or non-fully populated array of transducer elements. During course of travel of the carrier on which the transducer is mounted, successive acoustic transmissions take place whereupon the transducer elements provide output signals in response to the reflected energy. At least one synthetic aperture beam is formed by combining the element output signals from at least two successive transmissions wherein there is a predetermined gap between the array at a location at which a first transmission takes a location at which a subsequent transmission takes place.

8 Claims, 5 Drawing Sheets

SYNTHETIC APERTURE MINIMUM REDUNDANCY SONAR APPARATUS

BACKGROUND OF THE INVENTION

1. Field of the Invention

The invention in general relates to sonar systems, and particularly to an improved synthetic aperture side-looking sonar system.

2. Background Information

In side-looking sonar systems, apparatus on a carrier vehicle repetitively transmits acoustic pulses (pings) to sonify a target area. Energy reflected back from the target area impinges upon multi-element elongated receiver transducer, and beam-forming circuitry creates one or more receiver beams such that the energy reflected from adjacent narrow strips on the target area may be portrayed as a line-by-line picture that is a pattern of highlights and shadows analogous to an optically viewed panorama illuminated by side lighting, with objects outlined in such a way as to permit their identification.

There is considerable interest in applying the principles of synthetic aperture side-looking radar to side-looking sonar. A synthetic aperture system is based upon the generation of an effectively long antenna by signal-processing means rather than by the actual use of a physically long antenna. In synthetic aperture side-looking sonar systems, a multi-element receiver transducer is moved to take up sequential positions along a course line, and during movement, acoustic transmissions take place, whereby the energy reflected back from the target area causes the transducer elements to provide respective output signals which are stored. After a predetermined number of sequential pings during the course of travel, all of the stored signals are suitably processed to form one or more synthetic aperture beams each having a higher resolution due to the longer aperture, than the real aperture beam.

In the present invention, faster forward travel is possible and a much higher resolution synthetic aperture sonar beam is obtained utilizing fewer transducer elements, and associated circuitry, than conventional synthetic aperture sonar systems.

SUMMARY OF THE INVENTION

The carrier-borne synthetic aperture sonar apparatus of the present invention includes means for transmitting an acoustic pulse toward a target area under investigation in repetitive transmission cycles during course of travel of the carrier. An elongated array of N-transducer elements is provided, with the transducer elements being aligned in the direction of carrier travel with the first transducer element being first in the direction of travel and the Nth transducer element being last. Each transducer element is operable to provide a respective output signal in response to the impingement of acoustic energy reflected back from the target area as a result of a transmission. The means for transmitting is operable to transmit acoustic pulses during the course of travel such that there is a predetermined gap between the first transducer element at an array position at which a transmission takes place, and the last transducer element at a subsequent array position at which a transmission takes place. Individual transducer element output signals are stored and signal processing means processes the current and stored signals resulting from a predetermined number of transmissions and generates one or more beam output signals.

DESCRIPTION OF THE PREFERRED EMBODIMENTS

Figure 1:
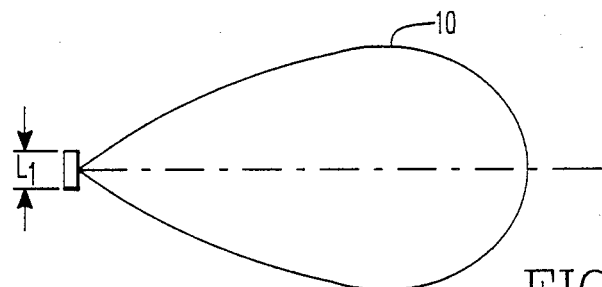
FIG. 1 illustrates a plan view of a beam pattern obtained with an antenna or transducer of length $L_1$.

FIG. 1 illustrates a plan view of a beam pattern 10 obtained with a transducer (or antenna) of length $L_1$. The far-field beamwidth $\beta$ is given by the relationship:

$$\beta = \lambda/L$$

where $\lambda$ is the wavelength of the energy transmitted and/or received and L is the length of the transducer.

Figure 2:
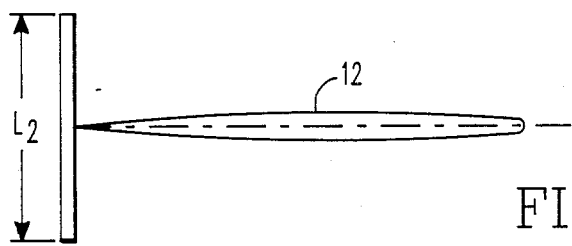
FIG. 2 illustrates the beam pattern obtained with a relatively longer antenna or transducer of length $L_2$.

In accordance with the above formula, as the length of the transducer increases, the beamwidth decreases, as illustrated in FIG. 2 wherein the relatively narrow beam 12 is provided by the relatively longer transducer of length $L_2$.

Figure 3:
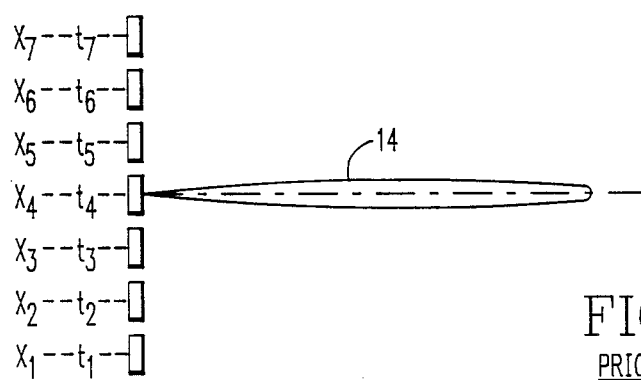
FIG. 3 illustrates the principles of the formation of a synthetic aperture beam.

In a synthetic aperture system, a relatively narrow beam such as illustrated in FIG. 2 is obtained with a relatively short transducer such as illustrated in FIG. 1. The principle is illustrated in FIG. 3 wherein the relatively short transducer is illustrated at position $X_1$ at time $t_1$, and for subsequent positions at subsequent points in time. Let it be assumed that the length of the transducer of FIG. 3 is $L_1$. By storing the received signals from each of the transmissions at times $t_1$ through $t_7$ at corresponding locations $X_1$ through $X_7$, and coherently adding the stored signals, the transducer of FIG. 2 is simulated, thereby resulting in the narrow beam 14 illustrated in FIG. 3.

Figure 4:
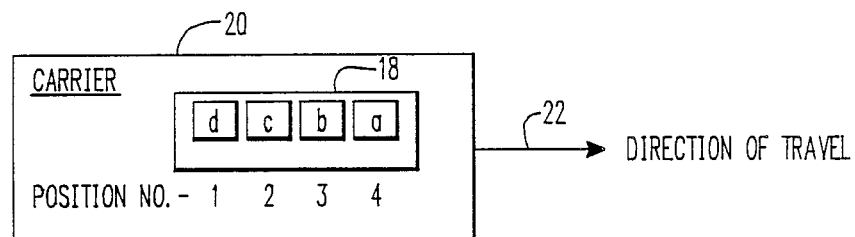
FIG. 4 illustrates a plurality of transducer elements on a carrier vehicle.

Increased speed of operation may be accomplished by providing an array of N transducer elements such as illustrated in FIG. 4 where N=4. In response to the impingement of acoustic energy, the transducer elements a, b, c, and d of the array provide respective output signals A, B, C and D, where A, B, C, and D are simplified representations of a complex output signal. The elements may be contained in a housing 18 which in turn is mounted on a carrier vehicle 20 which moves in the direction of travel indicated by arrow 22 over or through a target area under investigation. The array of elements extend along a line and occupy adjacent positions as indicated by position numbers 1 through 4 such that element a occupying position 4 is first in the direction of travel while element d occupying position 1 is last.

Figure 5:
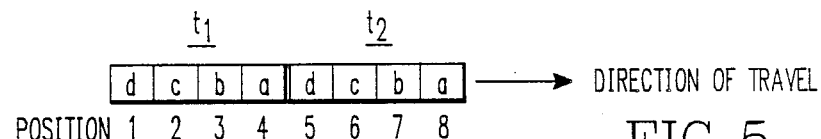
FIG. 5 illustrates the positioning of the transducer elements of FIG. 4 for a conventional synthetic aperture sonar operation.

FIG. 5 illustrates the principles of a conventional synthetic aperture sonar utilizing a transducer comprised of a plurality of transducer elements as illustrated in FIG. 4. For convenience, only the transducer elements themselves are shown in FIG. 5. An acoustic transmission takes place at time $t_1$ at which time the transducer elements a through d occupy the four positions illustrated. The output signals resulting from the transmission and subsequent reception are stored and a subsequent transmission takes place at time $t_2$ wherein the elements occupy positions 5 through 8. The two array positions are adjacent such that the last element d, occupying position 5 at $t_2$, is adjacent first element a, occupying position 4, for the previous transmission at $t_1$. Signal processing means combines the outputs of the elements resulting from the transmissions at $t_1$ as well as $t_2$ to generate a beam signal as though produced by a single transducer of eight elements occupying positions 1 through 8.

In the present invention faster speeds may be obtained along with higher resolution by utilizing a minimum redundancy array which is a particular implementation of a sparse array. Basically, a sparse array is formed from a linear equispaced array by deleting certain redundant transducer elements and substituting self- and cross-powered terms from the remaining elements to preserve the beam pattern and gain characteristics of the full array. Any two pairs of transducer elements with the same spacing will have the same correlation and are redundant pairs. Any transducer element which does not form at least one unique spacing and orientation pair with another element is redundant and may be deleted from the array since its contribution to the array output can be obtained from the other elements.

Figure 6:
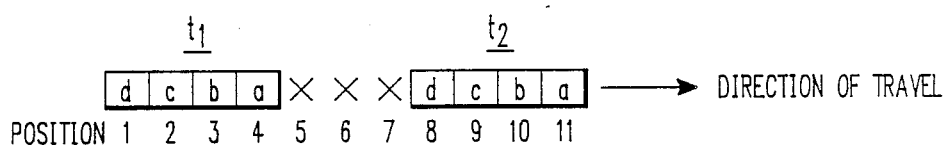
FIG. 6 illustrates the positioning of the transducer elements for a synthetic aperture operation in accordance with the present invention.

Thus, instead of simulating an eight-element array as in FIG. 5, the present invention can simulate a longer-length array as illustrated in FIG. 6. The four-transducer elements occupy the same position at time $t_1$; however, for the subsequent transmission at time $t_2$, the last element d occupies position 8, leaving a three-position gap (in the figure, an unoccupied position is designated by an "x") between the last element d at position 8 and the first element a at position 4 from transmission $t_1$, thus resulting in an equivalent 11-element transducer.

The positions and times illustrated are at the start of a run. In general, the gap is formed between the array at times $t_i$ and $t_{i+1}$ and the received signals resulting from more than two transmissions may be stored and utilized in the formation of one or more beams.

All of the element spacings required for the minimum redundancy array are present as indicated in the following table:

TABLE I

| Spacing | Position Numbers of Element Pairs |
| --- | --- |
| 1 | 1-2; 2-3; 3-4; 8-9; 9-10; 10-11 |
| 2 | 1-3; 2-4; 8-10; 9-11 |
| 3 | 1-4; 8-11 |
| 4 | 4-8 |
| 5 | 3-8; 4-9 |
| 6 | 2-8; 3-9; 4-10 |

TABLE I-continued

| Spacing | Position Numbers of Element Pairs |
| --- | --- |
| 7 | 1-8; 2-9; 3-10; 4-11 |
| 8 | 1-9; 2-10; 3-11 |
| 9 | 1-10; 2-11 |
| 10 | 1-11 |

Thus, it is seen from Table I that all of the required 10-element spacings for an 11-element array are present at least once.

Figure 7:
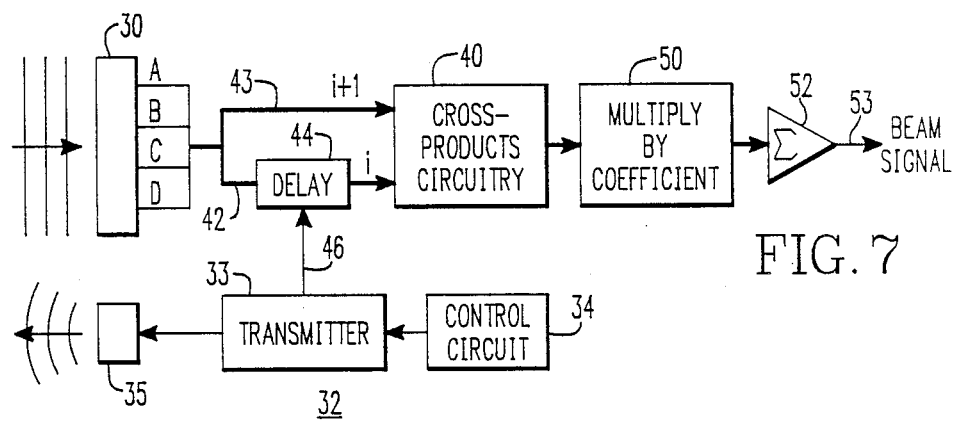
FIG. 7 is a block diagram functionally illustrating the signal processing utilized in one embodiment of the present invention.

FIG. 7 illustrates a functional block diagram of circuitry which may be utilized to accomplish the objectives herein. The apparatus includes the transducer array 30 comprised of N transducer elements, which for the present example is 4.

Transmitting means 32 includes a transmitter 33 governed by a timing and control circuit 34 operable to periodically energize transmitting transducer 35 for the projection of acoustic energy toward a target area under investigation. The reflected acoustic energy resulting from the transmission causes each of the transducer elements in array 30 to provide an output signal designated respectively A, B, C and D. The output signals are provided to a cross-products circuit 40 by way of two branches 42 and 43. Branch 42 includes a delay or storage means 44 such that the four output signals which are delayed represent those signals resulting from a transmission at time $t_1$ (or $t_i$) while the four signals in branch 43 are those resulting from transmission at time $t_2$ (or $t_{i+1}$). If the results from more than two transmissions are to be combined, additional branches and associated delays may be provided.

Delay 44 may be analog in nature or, if the functions are provided by a digital computer, delay 44 would be a storage, in which case analog-to-digital circuitry would be provided for converting the transducer element output signals to digital form. The delayed or stored signals may be transferred to the cross-product circuit 40 in response to a transfer signal on line 46 which may emanate from either the timing and control circuit 34 or, as illustrated, from the transmitter 33.

The results of the cross-products operation in circuit 40 are weighted by multiplying by certain coefficients in circuit 50, the results of which are summed in summing circuit 52 which provides the output beam signal on line 53 for display or other purposes.

Figure 8:
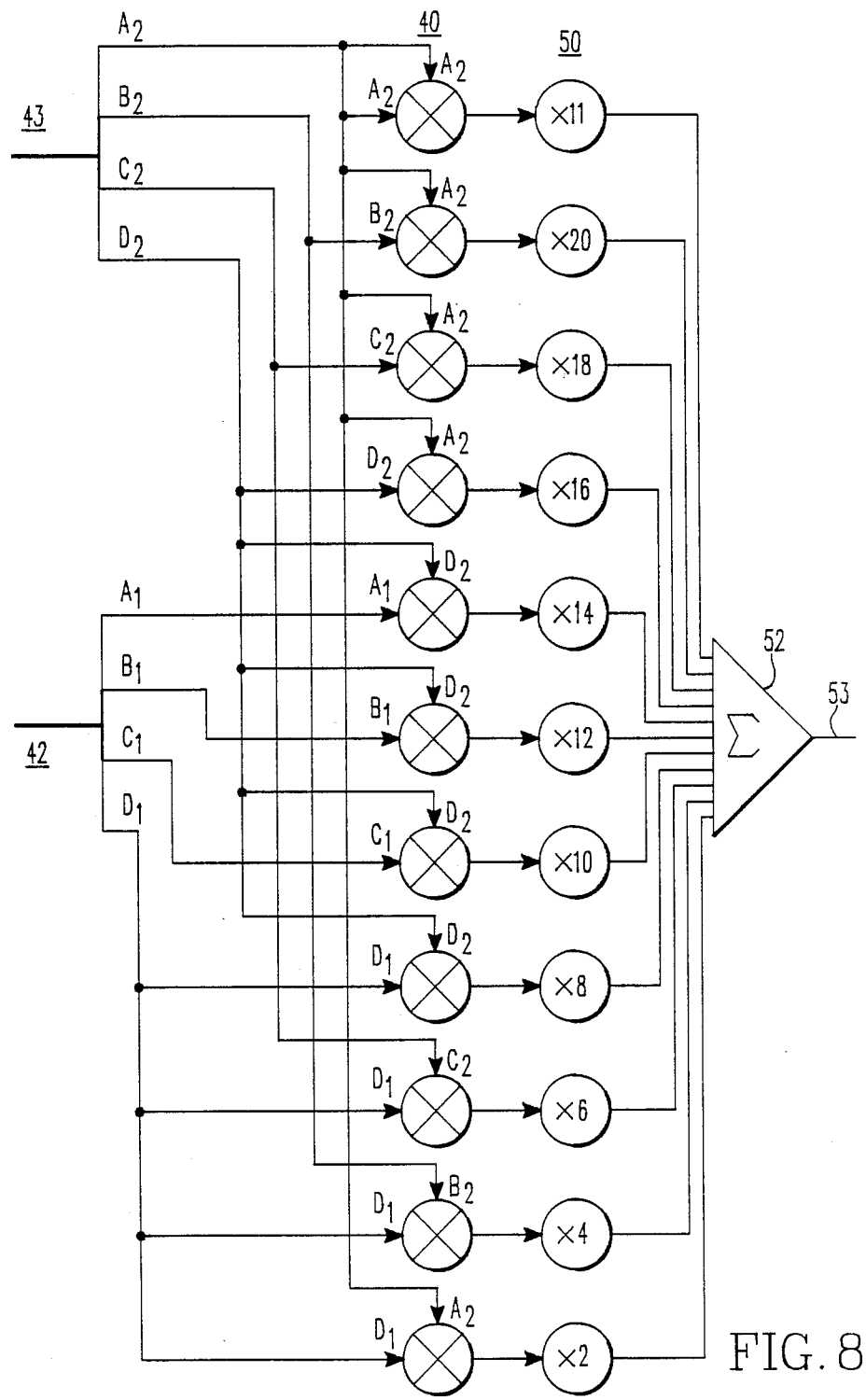
FIG. 8 is a more detailed view of several components of FIG. 7.

FIG. 8 illustrates in more detail one embodiment of the circuitry for performing the functions of blocks 40 and 50. Before proceeding with an explanation of FIG. 8, it may be beneficial to briefly discuss conventional signal processing and the theory behind minimum redundancy array signal processing.

In conventional signal processing the output signals provided by the transducer elements are summed and in one type of processing, are square-law detected by squaring and filtering out double frequency terms. This process may be written as:

$$|(A+B+C+D)|^2 = S \quad (1)$$

where S is the output signal.

Bearing in mind that the transducer element output signals are actually complex signals having a real and imaginary component, the signals are represented by a capital letter and the following mathematical treatment has been simplified for ease of understanding.

Performing the squaring operation results in Equation (2):

$$A^2+2AB+2AC+2AD+B^2+2BC+2BD+C^2+2CD+D^2=S \quad (2)$$

By combining the squared terms and separating the remaining terms by element spacing and then factoring, Equation (3) results:

$$(A^2+B^2+C^2+D^2)+2(AB+BC+CD)+2(AC+BD)+2AD=S \quad (3)$$

that is,

A to B, B to C and C to D represent a one-element spacing: A to C and B to D, a two-element spacing; and A to D, a three-element spacing; thus, all of the possible spacing arrangements for a four-element array are present.

In the minimum redundancy array:

$$A^2=B^2=C^2=D^2$$

$$AB=BC=CD$$

$$AC=BD$$

Therefore, the output S in Equation (3) may be represented as:

$$4A^2+6(AB)+4(BD)+2(AD)=S \quad (4)$$

Equation (4) contains no C term and, accordingly, the c transducer element may be eliminated from the array to provide a minimum redundancy array which provides the same output signal, provided that the proper multiplying coefficients are applied. These coefficients, 6, 4 and 2 in Equation (4), may be derived from the following formula:

$$2(P-K) \quad (5)$$

where P equals the number of element positions (which are greater than the number of elements) and K represents the particular spacing between elements. The coefficient for the squared term is equal to P.

In the embodiment of the present invention represented by FIG. 6, there are eleven element positions in the simulated longer transducer, with three of the positions being unoccupied either at time $t_i$ or $t_{i+1}$.

In FIG. 8 the delayed four element output signals in branch 42 resulting from the transmission at time $t_1$ are designated $A_1$ through $D_1$, and those signals resulting from the transmission at time $t_2$ in branch 43 are designated $A_2$ through $D_2$. The cross-products circuit 40 is functionally comprised of a plurality of multipliers for multiplying the representative signals illustrated to derive cross-products similar to those in parentheses in Equation (4), however, for an eleven-element case.

The multiplication circuit 50 contains a plurality of multipliers with the value of a multiplier indicated within the multiplication circles of FIG. 8 and derived in accordance with Equation (5) where P=11. The cross-products signals multiplied by the coefficients are then all summed in summing circuit 52 which provides the output beam signal on line 53.

As an alternative, if instead of using single element pairs for each multiplier, all element pairs with that particular spacing are used and rescaled, the signal-to-noise ratio can be improved. For example, the second multiplier multiplies terms $A_2$ and $B_2$ representing an element spacing of 1. Instead of multiplying $(A_2B_2)$ by 20, one may use all one-element spacing terms $(A_2B_2+B_2C_2+C_2D_2+A_1B_1+B_1C_1+C_1D_1)$. Since there are six terms involved, the original multiplier 20 would, for the alternate arrangement, be 20/6, or 3.33. Although this latter arrangement requires more multiplications, the signal-to-noise ratio is improved since the multiplier is 1/6 of what it was, and accordingly, the noise within the signal is multiplied by a factor of 6 less. If the implementation of the invention is performed by a digital computer, the signals provided on branches 42 and 43 may be stored and all of the multiplications required, performed in a fraction of a second.

FIG. 7 functionally illustrated the apparatus for deriving a synthetic aperture beam utilizing a minimum redundancy array. The concept is also applicable to a multibeam system and for a system which examines targets in the near field by well-known focusing procedures.

Figure 9:
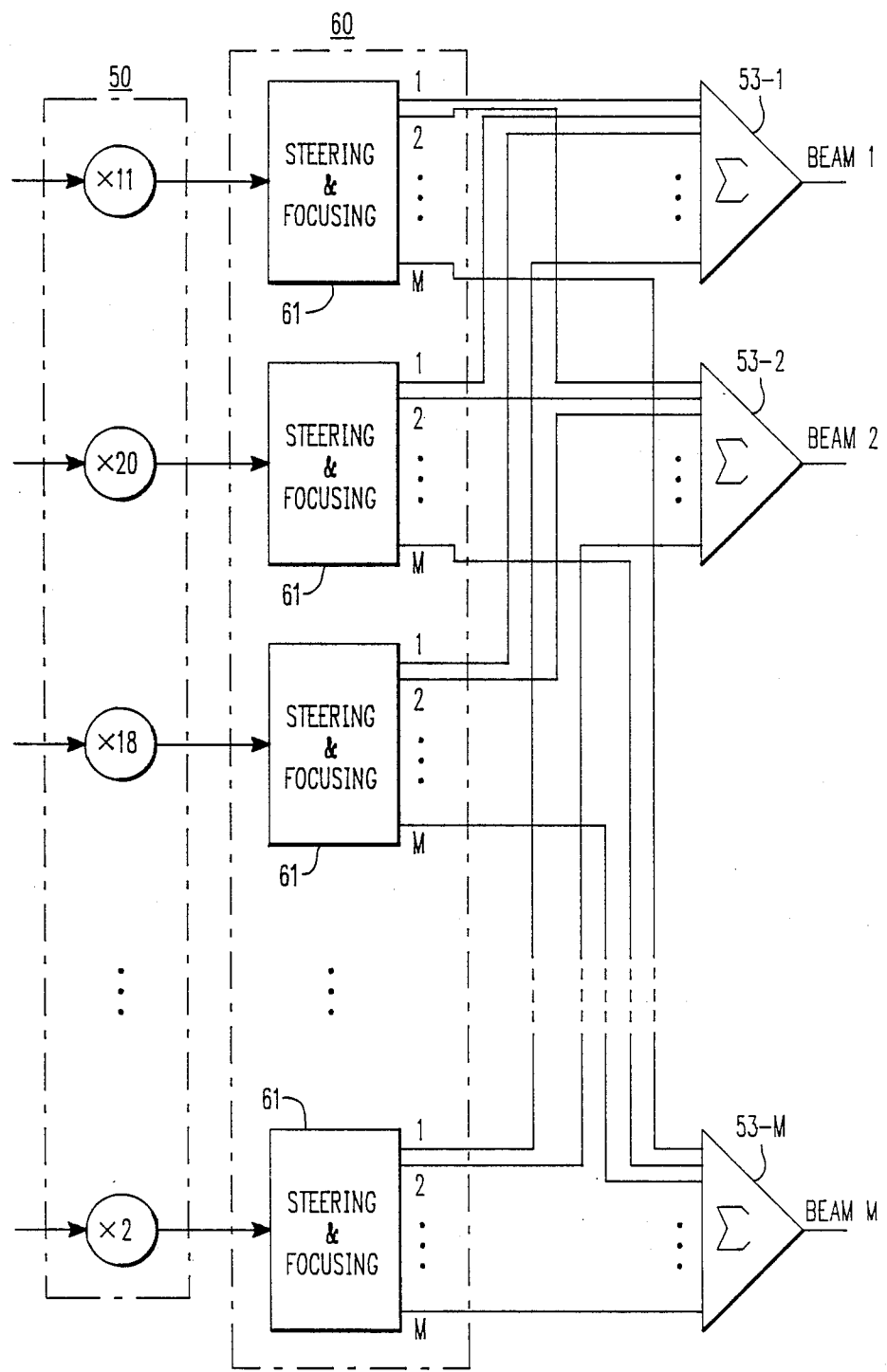
FIG. 9 illustrates an arrangement for obtaining multiple beam signals.

FIG. 9 illustrates by way of example additional circuitry required for forming M beams. The additional apparatus includes steering and focusing circuitry 60 having a plurality of units 61 each for receiving a respective output signal from the multipliers of circuit 50. Each unit 61 applies a predetermined phasing to its input signal and provides a phase-shifted signal on a plurality of outputs designated 1, 2, ... M. The phase-shifted signals on all of the output lines of all of the units 61 are provided to respective summation circuits 53-1 to 53-M as illustrated, resulting in the production of the beam signals for beams 1 through M.

Figure 10:
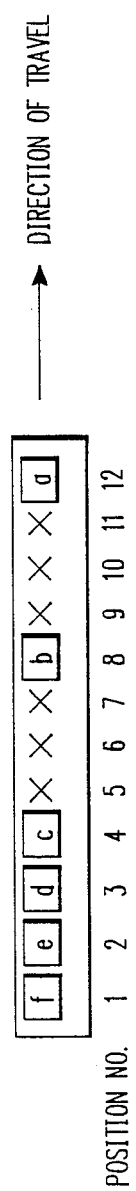
FIG. 10 illustrates a minimum redundancy transducer element array.
Figure 11:
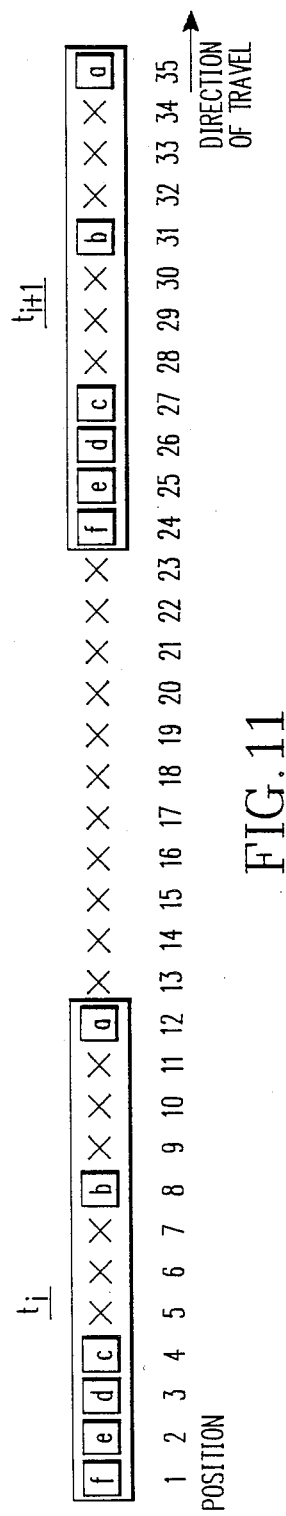
FIG. 11 illustrates a positioning of the array of FIG. 10 for synthetic aperture beam formation in accordance with another embodiment of the present invention.

FIGS. 10 and 11 illustrate another embodiment of the present invention which utilizes a transducer with omitted elements to generate one or more synthetic aperture beams, thus allowing even higher resolution at increased speeds with an attendant reduction in required circuitry.

FIG. 10 illustrates a minimum redundancy array having six elements a through f occupying positions 1 through 4, 8 and 12 with positions 5, 6, 7, 9 10 and 11 lacking elements. The transducer array will function as a minimum redundancy array since all required spacings from 1 to 11 are present. In the production of a synthetic aperture beam, FIG. 11 illustrates the array at time $t_i$ relative to one transmission and at $t_{i+1}$ relative to the next transmission with a predetermined gap (positions 13 through 23) from one transmission to the next. With just two transmissions therefor, a 35-element transducer array may be simulated since all of the required spacings from 1 to 34 are present. The signal processing to derive one or more synthetic aperture beams would be similar to that described with respect to FIGS. 7 through 11 with the cross-products and multiplication factors being illustrated in Table II.

TABLE II

| Cross Products | Multiplier | Cross Products | Multiplier |
|---|---|---|---|
| $F_2F_2$ | 35 | $E_2B_1$ | 36 |
| $E_2F_2$ | 68 | $D_2B_1$ | 34 |
| $D_2F_2$ | 66 | $C_2B_1$ | 32 |
| $C_2F_2$ | 64 | $F_2C_1$ | 30 |
| $C_2B_2$ | 62 | $E_2C_1$ | 28 |
| $D_2B_2$ | 60 | $D_2C_1$ | 26 |
| $E_2B_2$ | 58 | $C_2C_1$ | 24 |
| $F_2B_2$ | 56 | $C_2D_1$ | 22 |
| $C_2A_2$ | 54 | $C_2E_1$ | 20 |
| $D_2A_2$ | 52 | $C_2F_1$ | 18 |
| $E_2A_2$ | 50 | $B_2C_1$ | 16 |

TABLE II-continued

| Cross Products | Multiplier | Cross Products | Multiplier |
|---|---|---|---|
| $F_2A_2$ | 48 | $B_2D_1$ | 14 |
| $F_2A_1$ | 46 | $B_2E_1$ | 12 |
| $E_2A_1$ | 44 | $B_2F_1$ | 10 |
| $D_2A_1$ | 42 | $A_2C_1$ | 8 |
| $C_2A_1$ | 40 | $A_2D_1$ | 6 |
| $F_2B_1$ | 38 | $A_2E_1$ | 4 |
|  |  | $A_2F_1$ | 2 |

I claim:

1. Carrier-borne synthetic aperture sonar apparatus, comprising:
    (a) means for transmitting an acoustic pulse toward a target area under investigation in repetitive transmission cycles during course of travel of said carrier;
    (b) an array of transducer elements aligned from first to last in the direction of carrier travel, with the first transducer element being first in said direction of travel;
    (c) each said transducer element being operable to provide a respective output signal in response to impingement of acoustic energy reflected back from said target area as a result of a said transmission;
    (d) said means for transmitting being operable to transmit acoustic pulses during said course of travel such that there is a predetermined gap between the first transducer element at an array position at which a transmission takes place and the last transducer element at a next array position at which a transmission takes place; and
    (e) signal processing means responsive to said output signals provided by said transducer elements as a result of a predetermined number of said transmissions for generating at least one beam output signal.

2. Carrier-borne synthetic aperture sonar apparatus, comprising:
    (a) means for transmitting an acoustic pulse toward a target area under investigation in repetitive transmission cycles during course of travel of said carrier;
    (b) an array of transducer elements aligned from first to last in the direction of carrier travel, with the first transducer element being first in said direction of travel;
    (c) each said transducer element being operable to provide a respective output signal in response to impingement of acoustic energy reflected back from said target area as a result of a said transmission;
    (d) said means for transmitting being operable to transmit an acoustic pulse at a time $t_i$ and at a subsequent time, $t_{i+1}$, such that at said time $t_{i+1}$ there is a predetermined gap between the first transducer element at time $t_i$ and the last transducer element at time $t_{i+1}$; and
    (e) signal processing means responsive to said output signals provided by said transducer elements as a result of transmissions at both times $t_i$ and $t_{i+1}$, for generating at least one beam output signal.

3. Apparatus according to claim 1 wherein:
    (a) there are P possible transducer element positions in said array and there are P transducer elements.

4. Apparatus according to claim 1 wherein:
    (a) there are P possible transducer element positions in said array and there are N transducer elements, where $P > N$.

5. Apparatus according to claims 3 or 4 wherein:
    (a) the number of potential transducer element positions within said gap $< N$.

6. Apparatus according to claim 5 wherein:
    (a) the number of potential transducer element positions within said gap $= N - 1$.

7. Apparatus according to claim 1 wherein:
    (a) said signal processing means includes circuitry for simultaneously generating a plurality of said beam signals.

8. A method of forming a synthetic aperture sonar beam comprising the steps of:
    (a) transmitting an acoustic pulse toward a target area and receiving acoustic returns with an array of transducer elements;
    (b) storing the output signals provided by said transducer elements as a result of said returns;
    (c) moving said array to a subsequent position whereby a gap is formed between said subsequent position and the last previous position from which acoustic returns are received;
    (d) repeating steps (a) through (c); and
    (e) combining said output signals from a predetermined number of said transmissions to generate at least one beam signal.

* * * * *